Sept. 22, 1942.    L. A. WARD    2,296,658
MULTISTATION RIVET SELECTOR
Filed Feb. 13, 1941    2 Sheets-Sheet 1
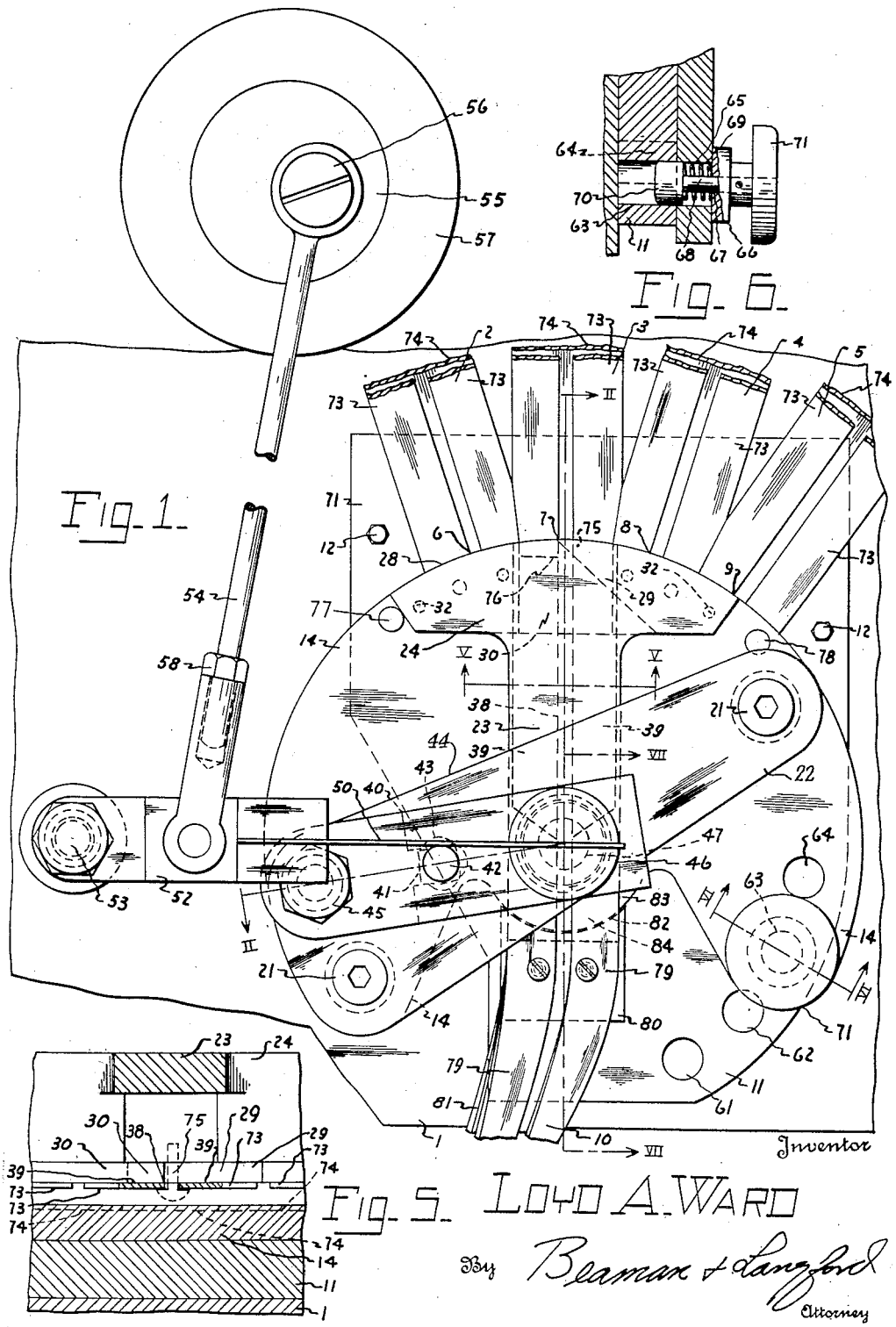
Inventor
LOYD A. WARD
By Beaman & Langford
Attorney

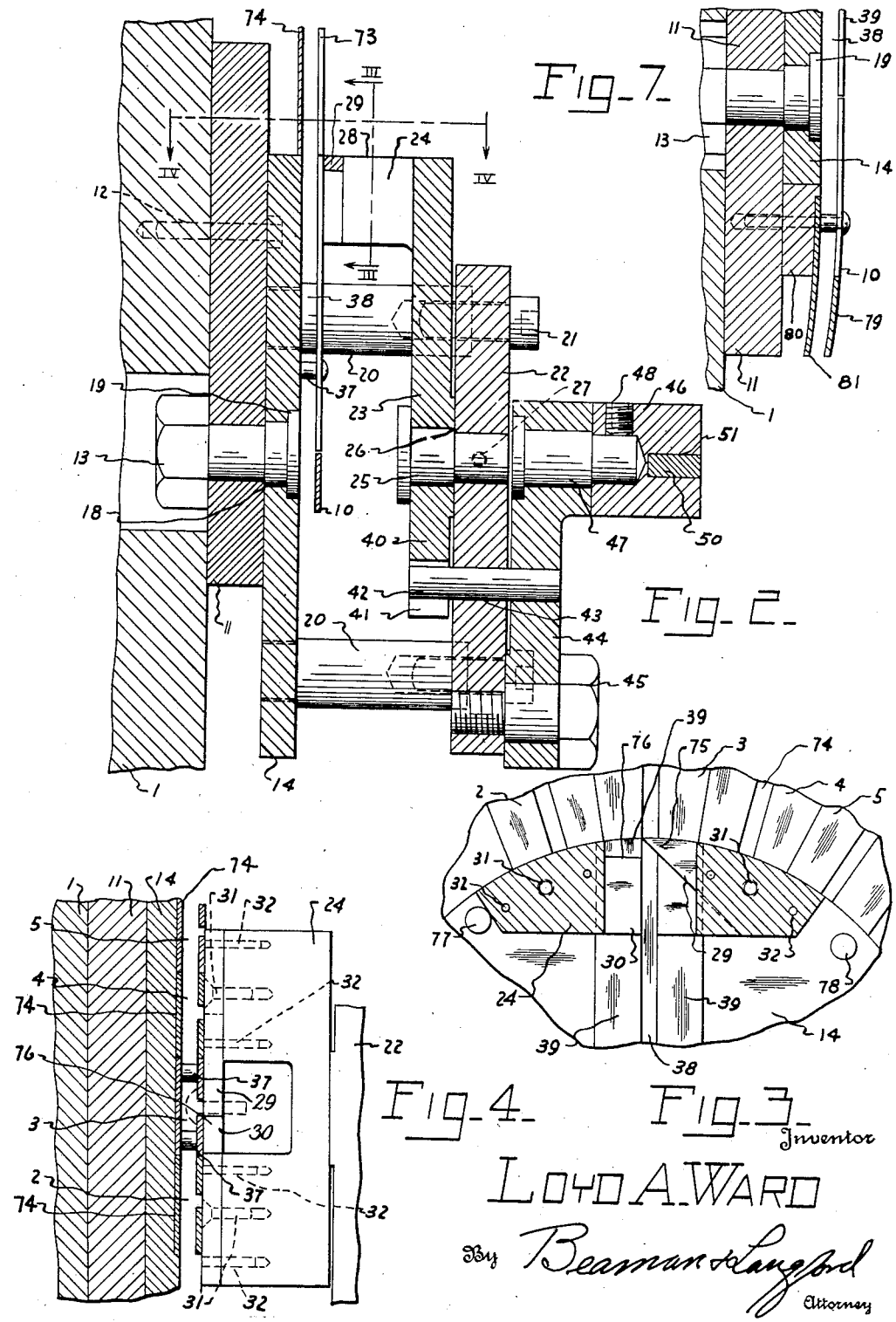

Patented Sept. 22, 1942

2,296,658

UNITED STATES PATENT OFFICE 2,296,658

MULTISTATION RIVET SELECTOR

Loyd A. Ward, Jackson, Mich., assignor to Tomkins-Johnson Company, Jackson, Mich., a corporation of Michigan Application February 13, 1941, Serial No. 378,709

15 Claims. (Cl. 78—46)

The present invention relates to rivet selectors for riveting machines and the like and more particularly to a selector for selecting a rivet from any one of a plurality of rivet stations having chutes feeding rivets thereto.

Objects to be riveted frequently require rivets of different sizes, depending on the thickness of the parts being secured together. When doing such riveting with a riveting machine having an automatic rivet feed, it becomes necessary to have a rivet selector with which rivets may be selected at will from any one of a plurality of stations, each carrying rivets of a different size. The present invention provides a multi-station rivet selector which is simple in construction and control and is positive in its operation.

An object of the invention is to provide a multistation rivet selector.

Another object of the invention is to provide a rivet selector which is movable into cooperative relation with any one of several rivet stations.

Still another object of the invention is to provide a multi-station rivet selector having associated therewith a movable chute, both the chute and the selector being movable into cooperating relation with any one of several rivet stations to select a rivet and direct it to another chute for conducting the rivet to its place of use.

A still further object of the invention is to provide a novel actuating mechanism for rivet selectors.

These and other objects residing in the combination, arrangement and construction of the parts will be apparent from the following specification when taken with the accompanying drawings in which:

Fig. 1 is a side elevation showing the invention supported from the frame of a riveting machine or the like, Fig. 2 is a section on the line II—II of Fig. 1, Fig. 3 is a section on the line III—III of Fig. 2, Fig. 4 is a section on the line IV—IV of Fig. 2, Fig. 5 is a section on the line V—V of Fig. 1, Fig. 6 is a section on the line VI—VI of Fig. 1; and Fig. 7 is a partial section on the line VII—VII of Fig. 1.

Referring particularly to the drawings, the reference character 1 indicates the frame of a riveting machine or the like. Associated with the frame are rivet chutes 2, 3, 4 and 5, into which rivets are fed by conventional hopper mechanism, the hopper mechanism not being shown on the drawings. The chutes 2, 3, 4 and 5 terminate in rivet stations 6, 7, 8 and 9 respectively. The stations 6, 7, 8 and 9 are arranged in the form of an arc and it is from these stations that the rivet selector selects rivets and feeds them to a chute 10 shown particularly in Fig. 1, which conducts the selected rivets to the point of use. Both in the claims and specification, it is to be understood that to the point of use means either directly to the anvil, to rivet holding jaws, to transfer mechanism for transferring the rivets to an anvil, or to a similar position.

The selector, according to the present invention, is mounted on a frame plate 11, secured to the frame 1, as by screws 12. Pivotally secured to the frame plate 11 by a bolt 13 is a base 14. The base 14 is in the form of a plate having a portion of the periphery thereof arcuate in configuration and the arc having the same radius and center of curvature as the arc defined by the stations 6, 7, 8 and 9. The bolt 13 is provided with a shoulder 18, as shown particularly in Fig. 2, which bears against the frame plate 11. The head 19 of the bolt 13 is recessed in the base 14, as shown particularly in Fig. 7, and permits pivotal movement of the base 14 about the bolt 13.

Secured to and spaced from the base 14 by shouldered studs 20 and screws 21 is a support 22. The support 22 is in the form of a plate and is parallel to the base 14. The support 22 has pivoted to it by a pin 25 the arm 23 of a selector 24. The pin 25 is provided with a shoulder 26 in order to permit free pivotal movement of the selector 24 about the pin 25. The pin 25 is secured in the support 22 by a set screw 27.

The axis of the pin 25 about which the selector 24 pivots, extends through the center of curvature of the arc provided by the rivet stations 6, 7, 8 and 9 and thus through the axis of the bolt 13. The selector 24 is provided with a segment having an outer edge 28 concentric with and in contiguity with the arc provided by the stations 6, 7, 8 and 9. The selector 24 is provided with selecting fingers 29 and 30, shown particularly in Figs. 3 and 4. The fingers 29 and 30 are in the form of plates secured by screws 31 and pins 32, as shown particularly in Fig. 4 to the body of the selector 24. As appears from Figs. 3 and 4, the fingers 29 and 30 have outer surfaces following the outer arcuate surface 28 of the selector body 24.

Suitably secured to the base 14 and spaced from the surface thereof by the studs 37 are flat metallic strips 39 spaced apart and extending from the outer curved surface of the base 14 to adjacent the axis of the bolt 13, providing with the base 14 a supplementary rivet chute 38. The outer ends of the strips 39 are arcuate and concentric with the arc of rivet stations 6, 7, 8 and 9.

The arm 23 of the selector 24 is provided with a tail piece 40, the end of which is bifurcated to provide a slot 41. The tail piece 40 is angularly disposed to the arm 23 as shown particularly in Fig. 1. The selector 24 is oscillated to select a rivet from any one of the stations 6, 7, 8 and 9 by a pin 42, extending through an arcuate slot 43 in the support 22 into fixed engagement with an actuating arm 44, pivoted to the support 22 by a shoulder screw 45. As shown particularly in Figs. 1 and 2, the shoulder screw 45 is connected to the support 22 at a point spaced from the axis of the pin 25. On the actuating arm 44 at the opposite side thereof from the pin 42 there is provided a knob 46, loosely pivoted thereto by a shoulder pin 47. The knob 46, the actuating arm 44 and the pin 47 are held in assembled relation by a set screw 48.

It will be seen from the description thus far that the selector 24 may be rocked back and forth about the pin 25 by rocking the arm 44 about the screw 45, the motion from the arm 44 being transmitted to the tail piece 40 of the selector 24 by the pin 42, extending through the arcuate slot 43 into the slot 41 in the end of the tail piece 40. Rocking movement to the actuating arm 44 is provided by a leaf spring 50 extending into a slot 51, extending transversely across the knob 46. The leaf spring 50 is cantilevered from an arm 52 pivoted about a shoulder screw 53 threaded into the frame 1. The arm 52 is rocked back and forth about the screw 53 by a connecting rod 54, connected off-center to the end of a shaft 55 by a shoulder screw 56. The shaft 55 is pivotally supported for rotation in a bearing member 57, generally shown in Fig. 1 and suitably mounted in the frame 1. For adjusting the length of the connecting rod 54 it is provided with an adjustment structure 58. The shaft 55 preferably is a part of the machine with which the selector is associated which makes one complete rotation each time the machine is actuated to upset a rivet. Thus as the machine is actuated to upset a rivet, the arm 52 is given a single back and forth motion, and this motion is transmitted through the cantilevered leaf spring 50 to the knob 46 and from the knob 46 through the actuating arm 44 and the pin 42 to the selector 24.

The selector 24 and the supplementary chute 38 are illustrated in Fig. 1 as being in operative relation with the rivet station 7 of the chute 3. The selector 24 and the supplementary chute 38 may be brought into operative relation with any of the stations 6, 7, 8 or 9 at will by appropriately moving the base 14 about the bolt 13. In order to maintain the base 14 in adjusted relation so as to hold the selector 24 and the supplementary chute 38 in operative relation with the desired rivet station 6, 7, 8 or 9, the frame plate 11 is provided with four holes 61, 62, 63 and 64, one for each of the rivet stations 9, 8, 7 and 6 respectively. Disposed in the base 14 is an opening 65 having the same diameter as the holes 61, 62, 63 and 64. The outer side of the opening 65 is closed by a member 66 having a bore 67 therethrough for receiving a pin 68. Disposed about the pin 68 within the opening 65 is a spring 69, which bears against the member 66 and against the enlarged end portion 70 of the pin 68. The opposite end of the pin 68 is pinned to a button 71. From Fig. 6 it will appear that by pulling outwardly on the button 71, the spring 69 may be compressed to draw the enlarged end portion 70 into the opening 65 to permit relative movement between the base 14 and the frame plate 11 and that upon the release of the button 71, the enlarged portion 70 will drop into the one of the holes 61, 62, 63 or 64 over which it is placed. Thus, in order to move the selector 24 and the supplementary chute 38 from operative association with the rivet station 7 into operative association with the rivet station 8, for instance, the button 71 is manually moved outwardly against the resistance of the spring 69 to withdraw the enlarged end portion 70 from the hole 63. Then, still holding on the button 71, the base 14 is rotated about the bolt 13 to bring the enlarged portion 70 over the hole 62. At this position, the button 71 is released, permitting the spring 69 to force the enlarged portion 70 into the hole 62 to rigidly hold the selector 24 and the supplementary chute 38 in operative association with the rivet station 8.

As appears particularly from Fig. 5, the flat strips 39 above the surface of the base 14, cooperating with the surface of the base 14 to provide the supplementary rivet chute 38, are in the plane of the front plates 73 of the chutes 2, 3, 4 and 5, and the back plates 74 of the chutes 2, 3, 4 and 5 terminate in abutting relation with the outer arcuate surface 28 of the base 14, the front surfaces thereof being in the plane of the front surface of the base 14. Also, the supplementary chute 38 is in alignment with the chute 3. Thus the outer arcuate surfaces of the fingers 29 and 30 and the outer arcuate surface of the left strip 39 prevent the escape of rivets from the rivet stations not in operative relation with the selector 24 and the supplementary chute 38. The escape of rivets from the rivet station 7 into the supplementary chute 38 on the base 14 is prevented by the selecting finger 29 which has a pointed nose portion 75, shown particularly in Figs. 3 and 5, in overlapping relation with the opening of the station 7, which is the lower end of the chute 3 and in alignment with the supplementary chute 38. The selecting finger 30 has a lowered edge 76, spaced downwardly from the outer arcuate surface 28 of the base 14. As shown in Fig. 1, the selecting finger 30 has its inner side edge terminating in alignment with the inner edge of the left flat strip 39, providing a part of the supplementary chute 38.

The angular rocking of the selector 24 is limited by pins 77 and 78, projecting outwardly from the base 14. The selector 24 is continuously urged against the stop pin 77 by the resiliency of the cantilevered leaf spring 50. The cantilevered leaf spring 50 may be positioned to urge the selector 24 against the pin 77 through the actuating arm 44, the pin 42 and the tail piece 40 of the selector 24 by properly positioning the shoulder screw 56 in the end of the shaft 55 and by adjusting the connecting rod 54 to give it the necessary length. It will be understood that the position of the shoulder screw 56 and the length of the connecting rod 54 will also be a factor in the providing of the selector 24 with a rocking of sufficient amplitude to actuate the selecting fingers 29 and 30 to select a rivet from the rivet station with which the selector 24 is operatively associated.

In operation, the button 71 is first manipulated to associate the selector 24 with the desired rivet station 6, 7, 8 or 9. At the same time, the supplementary chute 38 will be automatically positioned in alignment with the selected rivet station. The riveting machine or the like with which the selector is associated is then tripped providing the shaft 55 with a complete rotation. Through the off-center positioning of the shoulder screw 56, the connecting rod 54 is actuated to rock the arm 52 about its shoulder screw 53. The movement of the arm 52 rocks the cantilevered leaf spring back and forth once to rock the actuating arm 44 about its shoulder screw 45, moving with it the pin 42 to rock the tail piece 40 of the arm 23 of the selector 24 about the pin 25.

The selector in being rocked moves to the right and then back to its starting position viewing the structure in Figs. 1 and 3. As the selector 24 moves to the right, the selecting finger 29 moves to the right permitting a rivet at the rivet station 7 to drop onto the lowered edge 76 of the selecting finger 30. The lowered edge 76 is so spaced from the rivet station 7 as to permit the movement of only one rivet from the rivet station 7. As the selector 24 is returned to its original position, the pointed nose 75 thereof moves between the rivet selected and the one above it to prevent later downward movement of the last rivet not selected. At the same time, the rivet which has fallen into the supplementary chute 38 on the base 14 is drawn from the lowered surface 76 of the selecting finger 30 by the selecting finger 30 moving to the left of the supplementary chute 38.

When the lowered edge 76 has been moved from beneath the selected rivet to its left position, the selected rivet falls through the supplementary chute 38 into the chute 10 which terminates at the axis of rotation of the selector 24 and falls down the chute 10 into position to be used. The front plates 79 of the chute 10 are suitably supported from a block 80 on the frame plate 11 in alignment with the flat strips 39 supported in front of the base 14 forming the front of the supplementary chute 38, and the rear plate 81 of the chute 10 is recessed in the block 80 as shown in Fig. 7 to place its front surface in alignment with the front surface of the block 80. The block 80 has an arcuate edge 82, shown in Fig. 1, concentric with the arcuate edge 83 of the bearing boss 84 of the base 14 and has its front surface in the plane of the front surface of the base 14 so that the front surface of the block 80 constitutes a continuation of the bottom of the supplementary chute 38. It will be apparent from Fig. 1, that both strips 79 of the fixed chute 10, the upper ends of which terminate at the level of the axis of the bolt 13 and the flat strips 39 of the movable supplementary chute 38, the lower ends of which terminate adjacent the axis of the bolt 13 and are tapered, are arranged so as to provide a rivet passing connection from the chute 38 to the chute 10 regardless of the rotative position of the base 14, placing the selector 24 in operative association with any one of the rivet stations 6, 7, 8 or 9.

While the invention has been described as relating to the selection of rivets, it will be understood that other upsettable members than rivets may be equally as well selected by the apparatus acording to the present invention. Furthermore, it is not considered an essential feature of the invention that exactly four rivet stations be employed.

Having thus described my invention, what I desire to secure by Letters Patent and claim is:

1. A multi-station rivet selector comprising a plurality of rivet stations, a shiftable rivet selector, means to shift at will said selector into operative relation with any one of said stations, means to prevent the movement of rivets from those of said stations not in operative relation with said selector, and means to actuate said selector to select a rivet from the station with which it is in operative relation.

2. A multi-station rivet selector comprising a plurality of rivet stations, arranged in the form of an arc, a rivet selector having an arcuate surface concentric with said arc, shiftable at will about the center of curvature of said arc into operative relation with any one of said stations and being arranged for pivotal movement about said center of curvature to select a rivet from the station with which it is in operative relation, and means to prevent the movement of rivets from those of said stations not in operative relation with said selector.

3. In a multi-station rivet selector, a frame, a base shiftable with respect to said frame, a plurality of rivet stations fixed with respect to said frame, a shiftable rivet selector carried by said base, and means to shift said base to bring said selector into operative relation with any one of said stations, means to prevent the movement of rivets from those of said stations not in operative relation with said selector, and means to actuate said selector independently of said base to select a rivet from the station with which it is in operative relation.

4. In a multi-station rivet selector, a frame, a base, a plurality of rivet stations arranged in the form of an arc, fixed with respect to said frame, a rivet selector, carried by said base, having an arcuate surface concentric with said arc, means carried by said frame to guide said base for oscillation about the center of curvature of said arc to bring said selector into operative relation with any desired one of said stations, said selector being arranged for pivotal movement about said center of curvature independently of said base to select a rivet from the station with which it is in operative relation, and means to prevent the movement of rivets from those of said stations not in operative relation with said selector.

5. In a multi-station rivet selector, a frame, a base, a plurality of rivet stations arranged in the form of an arc, fixed with respect to said frame, a support rigid with respect to said base, a rivet selector carried by said support having an arcuate surface concentric with said arc, means carried by said frame to guide said base for oscillation about the center of curvature of said arc to bring said selector into operative relation with any one of said stations, said selector pivoted to said support at said center of curvature of said arc, and being arranged for pivotal movement about said center of curvature to select a rivet from the station with which it is in operative relation, and means to prevent the movement of rivets from those of said stations not in operative relation with said selector.

6. In a multi-station rivet selector, a frame, a base, a plurality of rivet stations arranged in the form of an arc, fixed with respect to said frame, a rivet selector, carried by said base, having an arcuate surface concentric with said arc, means carried by said frame to guide said base for oscillation about the center of curvature of said arc to bring said selector into operative relation with any desired one of said stations, a chute, carried by said base, for receiving selected rivets, said chute having one end for alignment with the station with which said selector is in operative relation and having the other end terminating adjacent said center of rotation, another chute carried by said frame, having its upper end terminating adjacent said center of rotation in receiving relation with said first named receiving chute for receiving rivets from said first named receiving chute and conducting them to their place of use, said selector being arranged for pivotal movement about said center of curvature independently of said base to select a rivet from the station with which it is in operative relation, and means to prevent the movement of rivets from those of said stations not in operative relation with said selector.

7. In a multi-station rivet selector, a frame, a base shiftable with respect to said frame, a plurality of rivet stations fixed with respect to said frame, a shiftable rivet selector carried by said base, means to shift said base to bring said selector into operative relation with any one of said stations, means to prevent the movement of rivets from those of said stations not in operative relation with said selector, a chute having an upper end carried by said frame, a second chute for receiving selected rivets, said second chute having one end movable into alignment with the station with which said selector is in operative relation and having the other end terminating adjacent said upper end of said first named chute, said first named chute receiving rivets from said second named chute and conducting them to their place of use, and means to actuate said selector independently of said base to select a rivet from the station with which it is in operative relation.

8. In a multi-station rivet selector, a frame, a base, a plurality of rivet stations arranged in the form of an arc, fixed with respect to said frame, a rivet selector, carried by said base, having an arcuate surface concentric with said arc, means carried by said frame to guide said base for oscillation about the center of curvature of said arc to bring said selector into operative relation with any desired one of said stations, an arm pivoted with respect to said base for pivoting said selector about said center of curvature independently of said base to select a rivet from the station with which it is in operative relation, and means to prevent the movement of rivets from those of said stations not in operative relation with said selector.

9. In a multi-station rivet selector for riveting machines and the like, a frame, a base, a plurality of rivet stations arranged in the form of an arc, fixed with respect to said frame, a rivet selector, carried by said base, having an arcuate surface concentric with said arc, means carried by said frame to guide said base for oscillation about the center of curvature of said arc to bring said selector into operative relation with any desired one of said stations, a cantilevered leaf spring operatively connected to said selector, an operative connection between an operative element of the machine with which the selector is associated and said spring to actuate said spring once each cycle of operation of the said machine to provide said selector with a pivotal movement about said center of curvature independently of said base to select a rivet from the station with which it is in operative relation, and means to prevent the movement of rivets from those of said stations not in operative relation with said selector.

10. In a multi-station rivet selector, a frame, a base, a plurality of rivet stations arranged in the form of an arc, fixed with respect to said frame, a support rigid with respect to said base, a rivet selector carried by said support having an arcuate surface concentric with said arc, means carried by said frame to guide said base for oscillation about the center of curvature of said arc to bring said selector into operative relation with any one of said stations, said selector being pivoted to said support at said center of curvature of said arc, an arm pivoted to said support at a point spaced from said center of curvature, means to pivot said arm under predetermined conditions, and an operative connection between said arm and said selector to transfer pivotal movement from said arm to said selector for selecting a rivet from the station with which it is in operative relation, and means to prevent the movement of rivets from those of said stations not in operative relation with said selector.

11. In a multi-station rivet selector, a frame, a base, a plurality of rivet stations arranged in the form of an arc, fixed with respect to said frame, a support rigid with respect to said base, a rivet selector carried by said support having an arcuate surface concentric with said arc, means carried by said frame to guide said base for oscillation about the center of curvature of said arc to bring said selector into operative relation with any one of said stations, said selector being pivoted to said support at said center of curvature of said arc, an arm pivoted to said support at a point spaced from said center of curvature, a cantilevered leaf spring operatively connected to said arm, an operative connection between an operative element of the machine with which the selector is associated and said spring to actuate said spring, under predetermined conditions of operation of said machine to provide said selector with a pivotal movement about said center of curvature independently of said base to select a rivet from the station with which it is in operative relation, and means to prevent the movement of rivets from those of said stations not in operative relation with said selector.

12. In a multi-station rivet selector for riveting machines and the like, a frame, a base, a plurality of rivet stations, arranged in the form of an arc, fixed with respect to said frame, a rivet selector, carried by said base, having an arcuate surface concentric with said arc, means carried by said frame to guide said base for oscillation about the center of curvature of said arc to bring said selector into operative relation with any desired one of said stations, a chute, carried by said base, for receiving selected rivets, said chute having one end for alignment with the station with which said selector is in operative relation and having the other end terminating adjacent said center of rotation, another chute carried by said frame, having its end terminating adjacent said center of rotation in receiving relation with said first named receiving chute for receiving rivets from said first named receiving chute and conducting them to their place of use, a cantilevered leaf spring operatively connected to said selector, an operative connection between an operative element of the machine with which the selector is associated and said spring to actuate said spring under predetermined conditions of operation of the said machine to provide said selector with a pivotal movement about said center of curvature independently of said base to select a rivet from the station with which it is in operative relation, and means to prevent the movement of rivets from those of said stations not in operative relation with said selector.

13. In a multi-station rivet selector, a frame, a base, a plurality of rivet stations arranged in the form of an arc, fixed with respect to said frame, a rivet selector, carried by said base, having an arcuate surface concentric with said arc, means carried by said frame to guide said base for oscillation about the center of curvature of said arc to bring said selector into operative relation with any desired one of said stations, said selector being arranged for pivotal movement about said center of curvature independently of said base to select a rivet from the station with which it is in operative relation, stops on said base for limiting the range of pivotal movement of said selector, yieldable actuating means yieldably urging said selector against one of said stops between rivet selecting movements and providing said selector with rivet selecting movement under predetermined conditions, and means to prevent the movement of rivets from those of said stations not in operative relation with said selector.

14. A rivet selector comprising a frame, a rivet station fixed with respect to said frame, rivet selecting fingers, an arm supporting said fingers, means pivoting said arm with respect to said frame, a cantilevered leaf spring for oscillating said arm under predetermined conditions to provide said fingers with a rivet selecting movement, stops for limiting the movement of said fingers, and means for actuating said cantilevered leaf spring.

15. Apparatus of the character described comprising a plurality of rivet stations, a chute, a supplementary chute in cooperating relation with said first named chute for directing selected rivets into said first named chute, a rivet selector, means to move said rivet selector and supplementary chute into cooperating relation with any one of said rivet stations, and means to actuate said selector to select a rivet from the station with which it is in cooperating relation and to direct it into said supplementary chute.

LOYD A. WARD.